March 4, 1941. A. U. HOOK 2,233,705
SHOCK ABSORBING CLUTCH
Filed Nov. 1, 1939
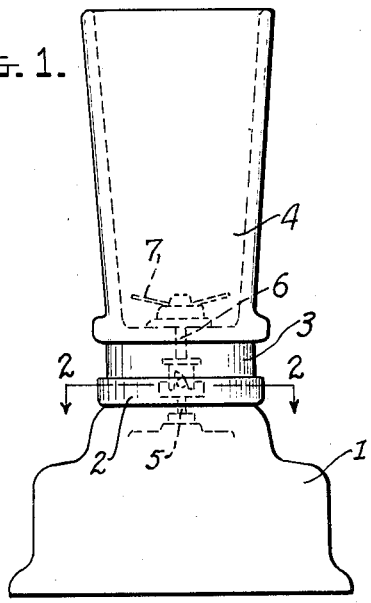
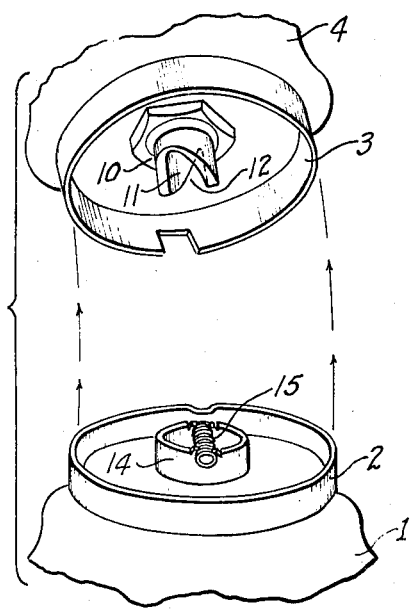
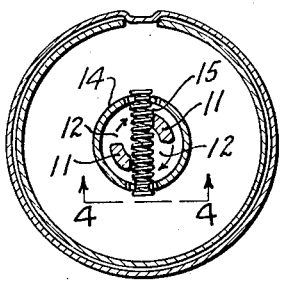
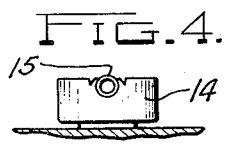
Inventor
Arley U. Hook
By Owen & Owen
Attorneys.

Patented Mar. 4, 1941

2,233,705

UNITED STATES PATENT OFFICE 2,233,705

SHOCK ABSORBING CLUTCH

Arley U. Hook, Fostoria, Ohio, assignor to Bersted Manufacturing Company, Fostoria, Ohio, a corporation of Ohio Application November 1, 1939, Serial No. 302,353

1 Claim. (Cl. 192—55)

This invention relates to clutches, and particularly to those of the shock absorbing type.

In the use of beverage mixers of the type employing a rotary cutter in the receptacle, the cutter shaft projects through the receptacle bottom and carries at its outer end a driven clutch member adapted to be engaged to a drive clutch member when the receptacle is placed on a base in which a drive motor is housed. The clutches heretofore employed for such purpose, so far as I am aware, have had positive non-yielding engaging action, which, due to the high speed at which the cutter is driven, is noisy in its action, and particularly so if a pressure tending to tip the receptacle relative to the base is applied or if the base is not level. Such a clutch is also frequently broken or other injury done due to a sudden engagement of the members. Numerous attempts and experiments have been made to overcome such objections.

The primary object of the invention is the provision of a separable clutch for use in connection with the cutter shaft of a mixer of the class described, and which will obviate the objections above-referred to.

A further object of the invention is the provision of a clutch with rotary drive and driven members having simple, efficient and improved means for effecting a yielding driving engagement of one by the other and preventing objectionable noise during an engagement or a running of the members.

The invention is fully described in the following specification, and a preferred embodiment thereof illustrated in the accompanying drawing, in which—

Figure 1 is a side elevation of a beverage mixer embodying the invention; Fig. 2 is an enlarged cross-section on the line 2—2 in Fig. 1; Fig. 3 is a fragmentary view thereof, with the base and receptacle shown in separated positions and in perspective to disclose the clutch members, and Fig. 4 is a fragmentary section on the line 4—4 in Fig. 2.

In the drawing, the clutch embodying the invention is shown applied to an electric beverage mixer having a base 1 enclosing an electric motor with upright shaft and having on its top a centering rim or means 2 for receiving the ring-like or extended base portion 3 of a receptacle 4. The motor shaft, marked 5, projects up within the rim 2, while the shaft 6, carrying the cutter 7 within the receptacle 4, projects down through the receptacle bottom to have releasable clutch engagement with the motor shaft when the receptacle is placed on the base.

The clutch for engaging the said drive and driven shafts 5 and 6, and in which the present invention resides, includes the customary clutch member 10 on the shaft 6, which member is preferably hollow axially of the shaft and has its outer end notched to form a pair of diametrically opposed teeth 11 with diametrically opposed notches 12 therebetween, and with the rear edges of the teeth, in the direction of driving, straight or substantially straight and substantially parallel to the shaft axis and with their front edges tapered or rearwardly inclined to outwardly broaden the notches, as shown.

The drive member of the clutch includes an enlargement 14, in the present instance of cup or cylindrical form, on the outer end of the motor shaft 5 and having a cup opening of sufficient size to freely receive the companion clutch member 10. Diametrically spanning the cup member 14 with its ends fixed to the cup side walls is a coiled spring 15 which is suitably positioned and of a diameter to enter the opposing notches 12 of the clutch member 10 when the latter is projected into the cup member 14. It is apparent that when the clutch members are thus engaged and the drive member is driven, a yielding driving action will be imparted to the other through the intermeshing engagement of the spring with the coacting rear edges of the teeth 11, as is apparent. The spring is preferably sufficiently stiff to normally drive the driven member without material stretch or give and to yield slightly under sudden shock loads. The spring, in the present instance, has its ends set into notches in the top edges of the cup member and firmly secured therein by peening of the metal against the spring.

I wish it understood that my invention is not limited to any specific construction, arrangement or form of the parts, as it is capable of numerous modifications and changes without departing from the spirit of the claim.

Having thus described my invention, what I claim as new, and desire to secure by United States Letters Patent, is:

In a clutch, separable rotatable drive and driven members, one member having portions spaced across its axis of rotation and a coiled contractile spring anchored at its ends to said portions and spanning the member axis, and the other member having a part for releasable straddling engagement with said spring intermediate said parts and providing a clutch tooth at each side of the part whereby the drive of one member from the other when in clutch engagement is through said spring laterally of its coil axis and tending to stretch the coil.

ARLEY U. HOOK.